Feb. 14, 1950     A. D. FERGUSON     2,497,076
GRINDING MACHINE Filed May 15, 1945     5 Sheets-Sheet 1

Inventor:
Alexander D. Ferguson.
by
Louis A. Maxom.
Atty.

Feb. 14, 1950 A. D. FERGUSON 2,497,076
GRINDING MACHINE
Filed May 15, 1945 5 Sheets-Sheet 2

Inventor:
Alexander D. Ferguson.
by
Louis A. Maxson.
Att'y.

Feb. 14, 1950     A. D. FERGUSON     2,497,076
GRINDING MACHINE Filed May 15, 1945     5 Sheets-Sheet 3

Inventor:
Alexander D. Ferguson.
by
Louis A. Maxson.
atty.

Feb. 14, 1950 A. D. FERGUSON 2,497,076
GRINDING MACHINE
Filed May 15, 1945 5 Sheets-Sheet 4

Inventor:
Alexander D. Ferguson.
by
Louis A. Maxson.
Att'y.

Feb. 14, 1950 — A. D. FERGUSON — 2,497,076
GRINDING MACHINE
Filed May 15, 1945 — 5 Sheets-Sheet 5

Inventor:
Alexander D. Ferguson
by
Louis A. Maxson
Atty.

Patented Feb. 14, 1950

2,497,076

UNITED STATES PATENT OFFICE 2,497,076

GRINDING MACHINE

Alexander D. Ferguson, Michigan City, Ind., assignor to Joy Manufacturing Company, a corporation of Pennsylvania Application May 15, 1945, Serial No. 593,803

20 Claims. (Cl. 51—103)

This invention relates to abrading or grinding machines and more particularly, but not exclusively, to improvements in abrading or grinding machines for concurrently grinding or smoothing a plurality of the sharp or rough edges of articles of annular shape such as metallic rings.

In the formation of annular metallic articles or metallic rings such as compressor valves of the annular plate type, or annular valve springs, a substantial problem has been encountered in the finishing—particularly smoothing—of the inner and outer peripheral edges of the valves or springs subsequently to the stamping out of the valves or springs into annular or ringlike form, due to the different sizes and different diameters and thicknesses thereof. Nonetheless, breakage when such smoothing operations are omitted is almost prohibitive, so its performance is important. Heretofore, the peripheral edges of the valves or springs have been finished by honing the edges by hand, a time consuming operation and one that results in substantial variation in the ultimate finishing of the valve or spring edges, since, by hand finishing, substantially uniform results are practically impossible.

In different embodiments of my broad invention two edges—an inner and an outer edge—may be ground at the same time, so that a reversal of the relation between the annuli and the stones will be necessary to complete the necessary grinding; or all four edges—two inner and two outer ones—may be simultaneously ground, so that grinding may be completed without substantially changing the relation between the annuli and the stones.

The invention may be embodied in various forms. In preferred embodiments there will be provided a series of elongated abrading or grinding stones. Desirably these may rotate on parallel or substantially parallel axes. Desirably also, there will be at least two stones—and two will ordinarily suffice—engaging the outer periphery of each annulus or ring to be finished, and at least one other stone—and one will ordinarily suffice—which passes through the inside of each annulus or ring and engages portions of the inner periphery of the annulus or ring. In one desirable embodiment of the invention, in which but one inner and one outer edge of each annulus—a number of annuli may be ground at once—will be ground simultaneously, the grinding stones may desirably be so arranged, or both so sized and arranged, that a line perpendicular to the plane of an annulus supported by said stones and passing through the center of such annulus will make an angle with the plane which is perpendicular to the plane in which the axes of the outer stones lie and midway between such axes. This result may be effected by locating the outer stones with their axes equidistant from the axis of the inner stone but with one of the outer stones larger than the other, or by using outer stones of the same diameters but with the axis of one nearer than the axis of the other to the axis of the inner stone. With this embodiment of the invention, means will be provided for automatically reversing the angles above mentioned after the annuli have moved desirable distances in contact with the stones in one inclined position.

In another desirable embodiment of the invention in which three stones are used, the sizing and/or spacing of the stones will be so modified that the annuli will occupy such angular positions that each of their outer edges may contact with one of the outer stones, and that each of their inner edges may contact with the stone which extends through the annuli and contact with it at opposite sides of a vertical plane including the axis of rotation of the inner stone. In this case, the outer stones may preferably rotate in opposite directions and the stone extending through the annuli will have means for varying its speed of rotation.

A desirable arrangement with each of the embodiments mentioned will include such an arrangement of the stones which coact with the outer periphery of the annuli that their axes shall lie in a substantially horizontal plane, or that a plane tangent to their upper peripheries shall be substantially horizontal, while the stone coacting with the inner peripheries of the annuli shall be in a position with its axis of rotation above, parallel to, and relatively between, as viewed from above, the axes of rotation of the lower stones. If the spacing of the axes of the stones is maintained constant, the effect upon the annuli will be substantially only a beveling, and, accordingly, it is desirable to provide means by which the upper stone, in the arrangements heretofore suggested, may be moved toward and from the axes of rotation of the other stones, particularly in the type of construction in which but one inner and one outer edge of the annuli are ground at the same time, for thereby there may be effected a rounding rather than a mere beveling of these edges.

The speed of rotation of the stone extending through the inside of the annuli in relation to the speed of the rotation of the stones engaging the outer peripheries of the annuli may determine the rate of travel of the annuli back and forth along the stones, and as well, through suitable selection of speed, be utilized to equalize the amount of stock removal by the stones. If the upper stone be reciprocated bodily up and down with respect to the lower stones as the stones revolve, so that the annuli may be brought gradually into a substantially vertical position as they travel along the stones instead of simply being sharply flopped over, truly rounded inner and outer peripheries may be formed on the annuli. By forcing the annuli along the stones at a rate slightly greater than they would travel if no force were applied, and causing the travel to be in synchronism with the vertical reciprocation of the upper stone, smooth uniformly curved surfaces on the annuli may be obtained. There is friction between the annuli and the rollers wherever there is relative movement between their contacting surfaces. When there is relative inclination between the relatively moving frictionally contacting surfaces a tendency to longitudinal movement of the annuli will be provided. When two stones of slightly different diameters contact the outer periphery of an annulus and rotate in the same direction and an inner stone rotates on an axis parallel to and equally spaced from the axes of rotation of the outer rollers an angular relation of the type mentioned will be provided, and the angular relation will be reversed upon the turning or "flopping" over of the annuli, so that reversal of annulus travel will be effected by simply turning it over. Like results are believed to be possible by using outer stones of the same diameters and making the axis of rotation of the inner stone slightly nearer to the axis of rotation of one than to the axis of rotation of the other outer stone. When the outer stones turn oppositely to each other and the inner stone is turned for a period at one speed and then for a succeding period at quite a different speed, and this procedure of alternate periods of relatively high and relatively low speeds is continued, opposite traverses of the annuli along the stones will take place; and I believe that this may be explained as due to the fact that where the angularly disposed annuli have a relative forward rotative movement relative to the stones at the points of engagement where the maximum friction occurs, travel in one direction along the stones will take place, while, if the relative rotative motion between the stones and the annuli is such that the stones are, in effect, turning the faster, opposite travel of the annuli will take place. This may be readily understood by considering two oblique surfaces in contact with each other. If one oblique surface is pushed rectilinearly relative to the other, the second will be moved in one direction. If the second is pushed relative to the first, the first will be moved in the opposite direction to the movement that was imparted to the second element when the first was the movement-effecting element. It is a fact, demonstrated many times experimentally, that such a change in speed of the inner stone does cause a reversal of the direction of movement of the annuli, and while I have advanced here the best theory that I know of for accounting for this reversal, it is to be understood that I do not limit my invention in any way to the correctness of this theory.

While I have spoken of stones in the preliminary description which appears above, it must be understood that these stones may be in fact stones, or may be artifically made compositions, or may be simply abrasive coatings applied to properly shaped rotating bodies, or even otherwise produced. The weight of the individual parts being abraded and the abrasive qualities of the stones may determine whether the bottom stones run in the same direction or in an opposite direction under some circumstances. If the stones used are of coarse grain and the parts to be abraded are light in weight, best results are obtained especially where the bottom stones run in opposite direction by causing the bottom stones to rotate in the opposite directions in such manner that points on their upper halves move towards each other, as this prevents bouncing of the parts to be abraded.

It is an object of my invention to provide an improved abrading machine. Another object is to provide a machine for automatically providing a uniform finish for the peripheral edges of annular workpieces while at the same time greatly increasing the rate of production. Yet another object is to provide an improved grinding machine wherein the action of the revolving grinding stones on the annuli to be finished and the relation of the latter with respect to the stones causes the annuli to travel along the stones during the grinding operation. A further object is to provide an improved grinding machine comprising three elongated grinding stones arranged in triangular formation with their axes in parallelism and one above the other two, with the outer peripheral edges of the annuli to be finished engaging the two bottom stones and the inner peripheral edges of the annuli engaging the upper stone in such manner that rotation of the stones effects translatory movement of the annuli therealong during the grinding operation. A still further object is to provide improved means for automatically reversing the annular workpieces when they reach their limit of travel along the stones in one direction. Still another object of the invention is to provide an improved grinding mechanism utilizing three stones so spaced as to effect simultaneous grinding of four sharp edges (all there are) at once and so arranged that changes in speed of one stone relative to the others, or vice versa, effects reversal in travel of the annular elements to be ground. Still another object of my invention is to provide an improved grinding apparatus including improved means for automatically altering the angular relation of objects to be ground to the stones, to provide grinding to rounded-edge form. These and other objects and advantages of the invention will, however, hereinafter more fully appear.

In the accompanying drawings there are shown for purposes of illustration several forms which the invention may assume in practice.

In these drawings.

In the several forms of the invention disclosed the improved abrading or grinding machine is generally designated 1 and the workpiece to be ground is generally designated 2. The workpiece 2 consists of a metallic article of annular or ring-like form such as an annular plate valve or spring designed for use in air compressors or pumps. It will be evident, however, that the workpieces may assume various annular forms and may comprise articles other than compressor valves or springs. Also that a number may be ground at once.

Figure 1:
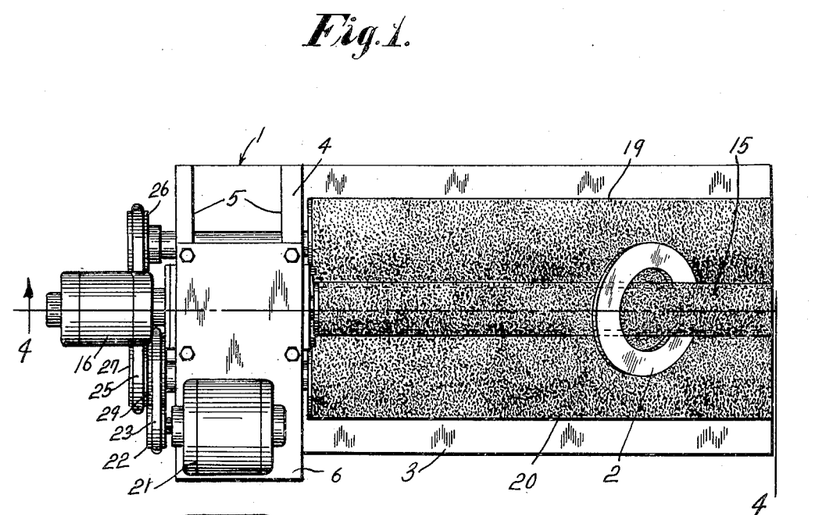
Fig. 1 is a plan view of the improved abrading machine constructed in accordance with an illustrative form of the invention.
Figure 2:
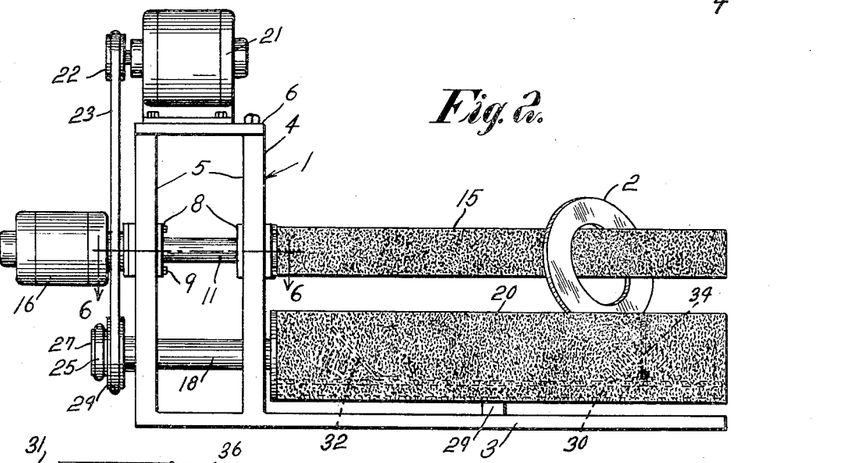
Fig. 2 is a side elevational view of the machine shown in Fig. 1.
Figure 3:
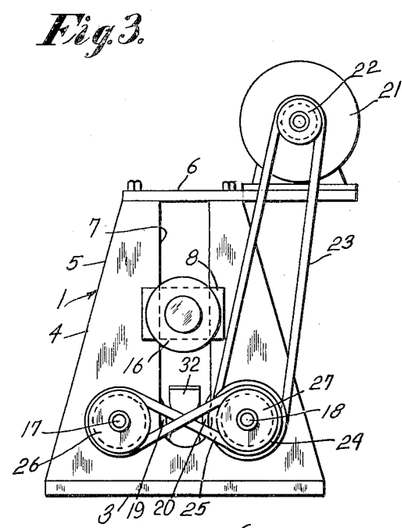
Fig. 3 is an end elevational view of the improved abrading machine.
Figure 4:
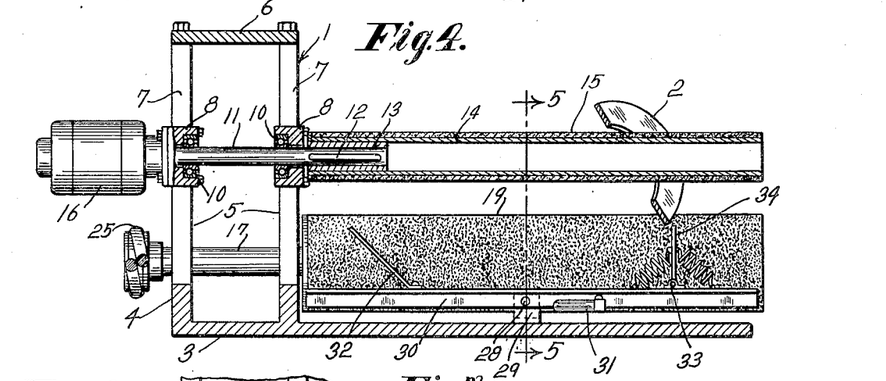
Fig. 4 is a view in central longitudinal vertical section taken substantially on line 4—4 of Fig. 1.
Figure 5:
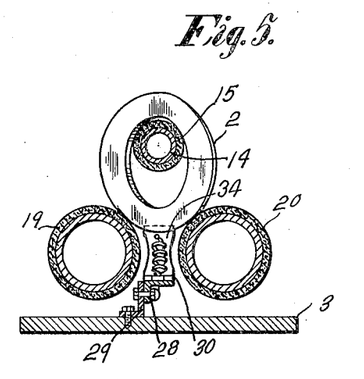
Fig. 5 is a cross-sectional view taken substantially on line 5—5 of Fig. 4.
Figure 6:
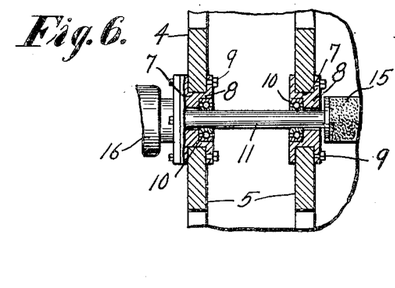
Fig. 6 is a horizontal sectional view taken on line 6—6 of Fig. 2.
Figure 7:
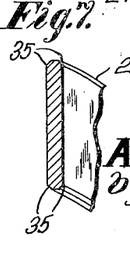
Fig. 7 is a detail sectional view illustrating a workpiece.
Figure 8:
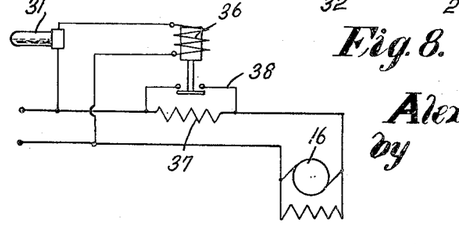
Fig. 8 is an electrical wiring diagram applicable to the machine of Figs. 1 to 7.

In the illustrative construction shown in Figs. 1 to 8 inclusive, the improved abrading machine 1 includes a base frame 3 having an upright support 4 at one end. The upright support may comprise spaced vertical portions 5 connected at their upper ends by a detachable top plate 6 and providing vertical guideways 7. Guided for vertical adjustment in the guideways 7 are slidable crosshead frames 8 adapted to be clamped in adjusted position as by screws 9, and journaled in bearings 10 supported within these crosshead frames is a horizontal longitudinal shaft 11. As shown in Fig. 4, keyed at 12 to the shaft 11 is a sleeve 13 in turn fixed to an elongated tubular shaft 14 on which an elongated circular abrading or grinding stone 15 is mounted. Carried by one of the crosshead frames 8 is a motor 16 herein preferably of the variable speed electric type having its power shaft connected to the shaft 11. The grinding stone 15 may be driven by the motor 16 at variable speeds as will later be explained. Journaled in suitable bearings supported by the spaced vertical portions 5 of the upright end support below the shaft 11 are parallel longitudinal shafts 17 and 18 which drive elongated circular abrading or grinding stones 19 and 20 respectively, the lower stones 19 and 20 extending coextensively with the upper stone 15. As shown in Fig. 5, the lower stones 19 and 20 are of the same diameters and are preferably of substantially greater diameter than that of the upper stone 15, and the axes of the three stones are preferably arranged at the corners of an isosceles triangle with the axis of the upper stone preferably located at the apex of the triangle. Mounted on the top plate 6 is a motor 21 preferably of the constant speed electric type having a pulley 22 fixed to its power shaft. The pulley 22 is connected by an endless drive belt 23 to a pulley 24 fixed to the parallel shaft 18. The shafts 17 and 18 are connected together in driving relation by a crossed belt 25 engaging pulleys 26 and 27 fixed to the shafts 17 and 18 respectively. Thus the lower stones 19 and 20 are driven by the motor 21 at a constant speed in relatively opposite directions. Desirably points on the upper halves of the stones 19 and 20 turn towards each other. By loosening the screws 9, the crosshead frames may be adjusted vertically along the guideways 7 to vary the location of the upper stone with respect to the lower stones so as to enable the grinding of the annular workpieces of different sizes. In this illustrative construction, pivotally mounted at 28 on a bracket 29 secured to the base frame 3 is a switch lever 30 which operates a "mercoid" switch 31. A stop 32 is secured to one end of this switch lever while pivotally mounted at 33 at the opposite end of the switch lever is a resiliently positioned stop 34. The stop 34 may be swung down in either direction to enable the annular workpieces to pass beyond the same in a direction longitudinally of the stones. The annular workpieces or compressor plate valves or springs 2 are placed in grinding relation with respect to the three stones with the upper stone extending through the open center of the annulus. The annulus is turned laterally relative to the longitudinal dimension of the machine and supported, usually at least, in a somewhat sloping position, with its outer side edges contacting with the lower stones—one with each—and with its inner edges contacting, at points spaced from the top of the opening in said annulus and at opposite sides of such point, with points on the upper stone at opposite sides of, but near the top of, the latter. Accordingly when the stones are rotated, the inner and outer edges of the valve are simultaneously completely ground. When the grinding stones are driven, the workpiece 2, due to its inclined position, travels along the stones, due to the direct contact of the workpiece with the stones, and, as a result of the inclined position of the workpiece, beveled edges 35 are formed on the inner and outer peripheries of the workpiece as shown in Fig. 7. Due to the particular relation of the annular workpiece with respect to the grinding stones, all of the four peripheral edges are, as above noted, concurrently ground, with the upper stone 15 engaging the opposite inner peripheral edges of the workpiece and the bottom stones respectively engaging the opposite outer peripheral edges. The workpiece travels toward the left, as viewed in Figs. 1 and 2, and, when the annulus engages the stop 32 on the switch lever, the latter is tilted to operate the "mercoid" switch 31 to effect actuation of a solenoid 36, thereby to cut out the resistance 37 and to effect speeding up of the motor 16 through direct supply of current through the direct line 38. When the upper stone is driven at a relatively higher speed, the direction of movement of the workpiece along the stone is automatically reversed, and, as a result, the workpiece travels back toward the right as viewed in Figs. 1 and 2. When the workpiece engages the resiliently positioned stop 34, the switch lever 30 is tilted in the opposite direction to actuate the "mercoid" switch 31 to effect de-energizing of the solenoid 36 to cut in the resistance 37, thereby again to slow down the speed of the motor 16. The speed of rotation of the upper stone in relation to the two lower stones determines the rate of travel and the direction of travel of the workpieces back and forth along the stones, as well as serving to equalize the amount of stock removal. By driving one of the lower stones in a direction opposite to the other lower stone, the necessary "lag" for grinding is provided.

Figures 14, 16, 17, 18, 19:
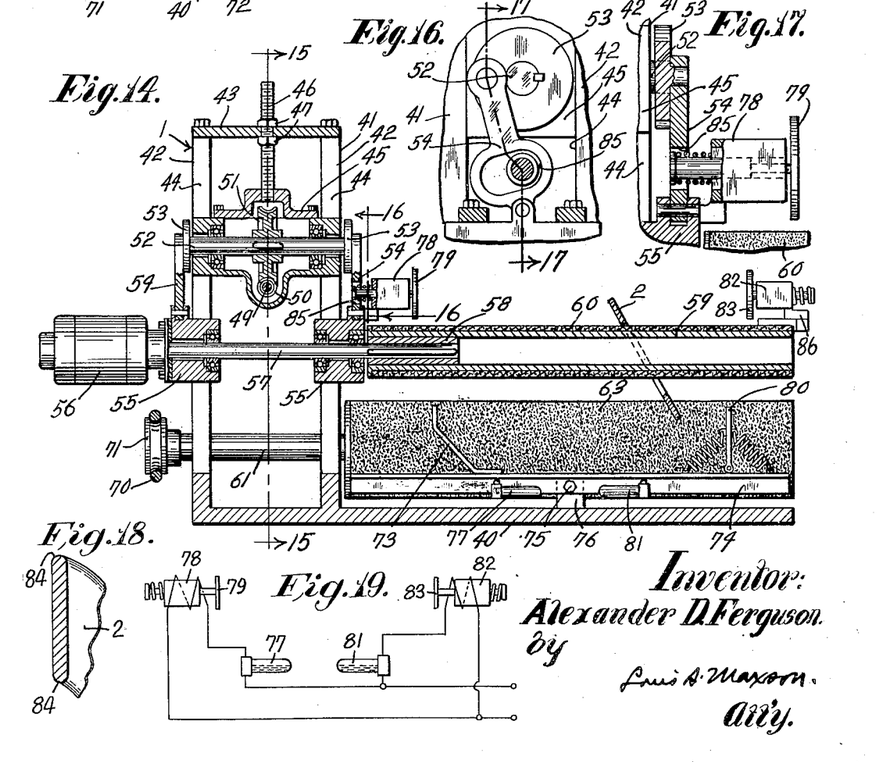
Fig. 14 is a view in longitudinal vertical section taken substantially on line 14—14 of Fig. 9.
Fig. 16 is an enlarged detail vertical sectional view taken on line 16—16 of Fig. 14.
Fig. 17 is a vertical sectional view taken on line 17—17 of Fig. 16.
Fig. 18 is a detail sectional view illustrating a workpiece.
Fig. 19 is an electrical wiring diagram applicable to the machine of Figs. 9 to 17.
Figure 15:
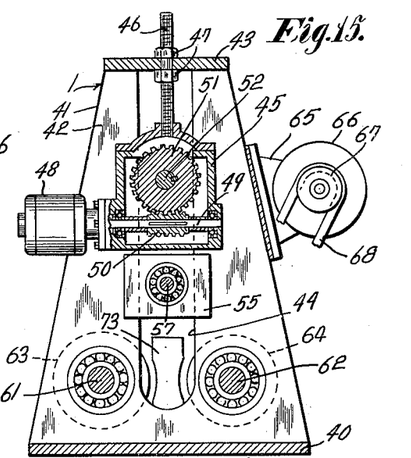
Fig. 15 is a cross-sectional view taken substantially on line 15—15 of Fig. 14.

Under certain conditions, it is desirable to finish the annuli with a radius on the peripheral edges instead of a straight bevel, and, to form such curved edges, and to provide the improved grinding which my invention makes possible, the following modified construction is provided. In Figs. 9 to 19 inclusive, a modified form of abrading machine is disclosed. In this embodiment, there is a base frame 40 having an upright support 41 at one end. This upright support comprises spaced vertical portions 42 connected by a detachable top plate 43 and providing vertical guideways 44. Adjustable vertically along the guideways 44 is a crosshead frame 45, and a screw 46 is provided for adjusting the crosshead frame into different positions along the upper portions of the guideways. Engaging the top and bottom surfaces of the top plate 43 are adjusting nuts 47. Carried by the crosshead frame 45 is a motor 48, preferably a constant speed electric motor having its power shaft connected to a horizontal transverse shaft 49 (see Fig. 15) journaled in bearings supported within the crosshead frame. Keyed to the shaft 49 is a worm 50 meshing with a worm wheel 51, the latter being keyed to a longitudinal shaft 52 likewise journaled in bearings within the crosshead frame. Fixed to the opposite ends of the shaft 52 at the opposite sides of the vertical end support 41 are eccentrics 53 connected by links 54 to slidable crossheads 55 respectively guided in the vertical guideways 44 below the crosshead frame. When the motor 48 is running, the crossheads 55 are moved concurrently up and down along the guideways through the eccentrics and links. Carried by one of the crossheads 55 (Fig. 14) is a motor 56, preferably a constant speed electric motor, having its power shaft connected to a longitudinal shaft 57 journaled in bearings supported within the crossheads 55. This shaft is keyed to a sleeve 58 to which an elongated tubular shaft 59 is secured, and an elongated circular abrading or grinding stone 60 is mounted on this tubular shaft. Journaled in bearings supported within the spaced vertical support portions 42 of the support 41 below the shaft 57 are parallel longitudinal shafts 61 and 62, parallel to the shaft 57 and having mounted thereon elongated circular abrading or grinding stones 63 and 64 respectively which extend coextensively with the upper stone. The stones 63 and 64 are preferably of greater diameters than the upper stone 60, and the lower stone 63 is preferably of slightly greater diameter than the lower stone 64 as clearly shown in Fig. 11 though their axes are spaced equally from the axis of the stone 60. Carried by a bracket 65 attached to the end support 41 is a motor 66, preferably a constant speed electric motor having its power shaft connected to a drive pulley 67. The pulley 67 is connected by an endless drive belt 68 to a pulley 69 fixed to the shaft 62. An endless open belt 70 engages pulleys 71 and 72 fixed to the shafts 61 and 62 respectively to drive the lower stones 63 and 64 at the same angular speeds in the same direction. Due to the slightly greater diameter of the lower stone 63, the necessary "lead" is provided for the workpieces to cause the latter to travel along the stones as the stones rotate as will later be explained. The upper stone 60 rotates in a direction opposite to the lower stones 63, 64 and provides the necessary "lag" for grinding. By adjusting the upper crosshead frame 45 along the guideways 44, annular workpieces of different sizes may be accommodated. The annular workpiece is placed over the free ends of the stones in the manner shown in Fig. 10 with the workpiece tilted slightly forwardly at its upper side, and, when the stones are rotated, the larger bottom stone 63 causes the workpiece to turn slightly and provide the necessary "lead" so as to cause the workpiece to travel along the stones. This relatively slight turning is not shown in Figs. 9, 10 and 11. As the workpiece travels along the stones towards the left in Fig. 10, the crossheads 55 first move downwardly along the guideways causing the workpiece to increase its tilt forwardly and then the crossheads move upwardly to tilt the workpiece toward an upright position so that, when the workpiece reaches the end of its travel toward the left, it is in a substantially vertical position. In this instance, when the workpiece approaches the end of its travel toward the left in Fig. 10, its lower side engages a stop 73 on a switch lever 74, the latter being pivoted at 75 to a bracket 76 carried by the base frame. Engagement of the workpiece with the stop causes the lever to tilt to effect actuation of a "mercoid" switch 77, thereby energizing a solenoid 78. The core of this solenoid, when the latter is energized, moves toward the right in Fig. 14, causing the plunger 79 to engage the upper side of the workpiece to tilt the latter in the opposite direction. When the workpiece is tilted in the reverse position, it travels toward the right in Fig. 14, until its lower side engages a resiliently positioned stop 80 similar to the stop 34, again causing tilting of the switch lever 74 to effect de-energizing of the solenoid 78 and to actuate a "mercoid" switch 81 for energizing a solenoid 82 to cause a plunger 83 to operate and reverse the tilting of the workpiece. As the workpiece moves to the right, the crossheads 55 move so that the workpiece is tilted downwardly and then upwardly, reaching a substantially vertical position as it reaches the point where its tilting is reversed by the plunger 83. Accordingly, as the workpiece travels back and forth along the stones, it is tilted from a substantially vertical position at each end of the stones toward an inclined position and then toward a vertical position, thus causing the inner and outer peripheries thereof to be rounded as at 84 in Fig. 18. As shown in Figs. 16 and 17, the solenoid 78 is mounted on the inner sliding crosshead 55, and, since the spring pressed core of the solenoid extends toward the left beyond the adjacent link 54, it is necessary to provide the link with an opening 85 to receive the projecting core end. This opening extends arcuately so that, as the link swings back and forth during driving of the eccentric, it clears the solenoid core. The solenoid 82 is preferably mounted on a bracket 86 pivoted at 87 on a frame 88, the latter being rigidly attached to the inner sliding crosshead 55, i. e. the same crosshead which carries the solenoid 78. The pivoted bracket 86 is provided with a suitable pin lock 89. The pin lock may be released to enable swinging of the bracket into the dotted line position indicated in Fig. 9 to permit the placing of the workpieces in grinding relation with respect to the grinding stones. The finished workpiece may be removed from the free ends of the stones by hand or otherwise.

Figure 20:
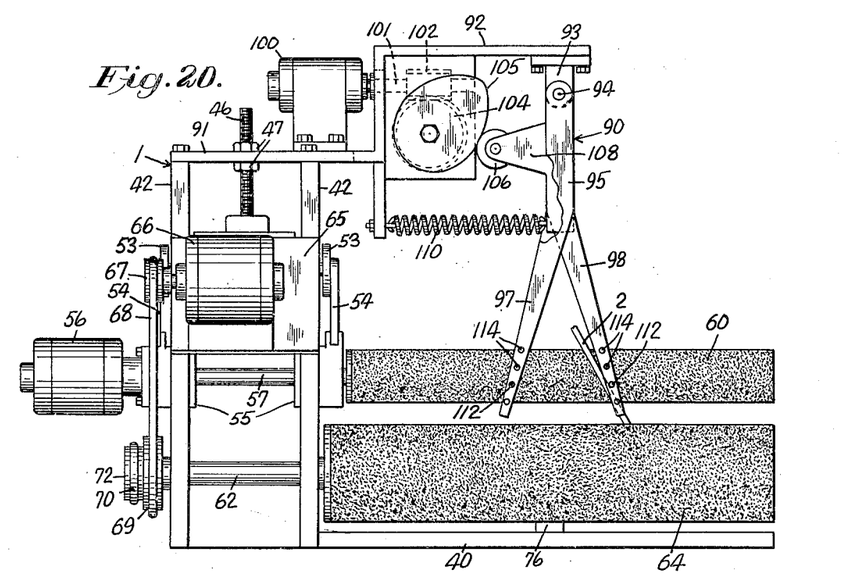
Fig. 20 is a side elevational view of an abrading machine constructed in accordance with still another modified form of the invention.
Figure 21:
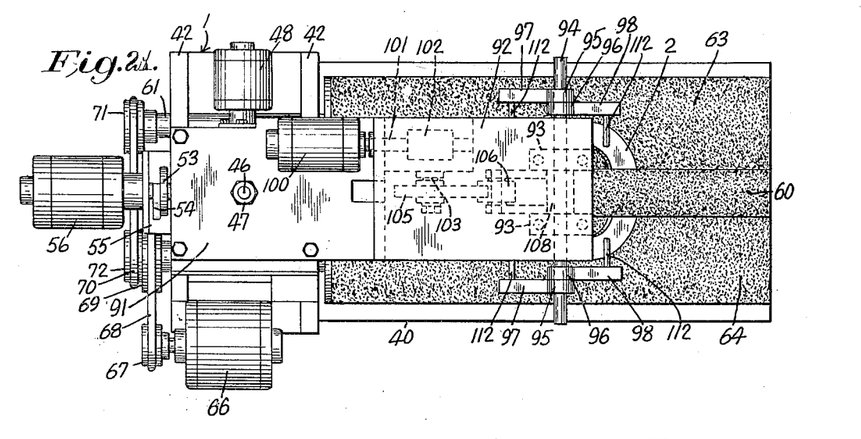
Fig. 21 is a plan view of the machine shown in Fig. 20.

In the modified form shown in Figs. 20 and 21 inclusive, the abrading machine is like that shown in Figs. 9 to 19 inclusive except that a mechanism, generally designated 90, is provided for moving the workpiece 2 along the grinding stones in the desired manner. In place of the top plate 43 in the form shown in Figs. 9 to 19 there is provided a supporting frame 91 having a portion 92 projecting over the stone 60. Connected to the frame portion 92 are members 93 rotatably supporting a transversely extending shaft 94 to which arms 95 and 96 are fixed at opposite sides of the stone 60, the arms having portions 97 and 98 spaced angularly from each other as shown. Mounted on the frame 91 is a motor 100 having a power shaft 101 to which a worm 102 is connected. Supported by the frame is a shaft 103 carrying a worm wheel 104 meshing with the worm 102 and carrying a cam 105 engageable by a roller 106 supported by a member 108 fixed to the shaft 94 at its mid-portion. A spring 110 connected at one end to the frame 91 and at its other end to the member 108 operates to hold the roller 106 in engagement with the cam 105. It will be seen that a rotation of the cam 105 causes the shaft 94 to oscillate by reason of the engagement of the roller 106 with the cam, and swing the arms 95 and 96. The speed of the motor 100 is regulated so as to swing the arms in synchronism with the raising and lowering of the crossheads 55, the arms reaching the end of each swing just as the crossheads reach their uppermost positions, and the arms being at the mid-point of each swing when the crossheads reach their lowermost positions. The workpiece is placed on the stone 60 between the arm portions 97 and 98, the arm portions 98 operating to force the workpiece along the stones toward the left as shown in Fig. 20, and the portions 97 tilting the workpiece and then forcing it toward the right-hand end of the stones. The arms operate on the workpiece through inwardly projecting pins 112 which are adapted to be inserted through different openings 114 in the arms for obtaining the desired point of contact when grinding workpieces of different diameters. It will be seen that a movement of a workpiece along the stones in synchronism with the changing of its angular position with respect to the stones, assures smooth, continuously curved ground surfaces on the workpiece.

The general mode of operation of the several forms above described is as follows. In the preferred embodiment, one or more of the annular workpieces 2 may be placed over the free end of the upper grinding stone 15 with the opposite edges of its inner periphery engaging the upper stone and with the outer edges of its outer periphery at two spaced points respectively engaging the lower stones 19 and 20. The upper stone 15 may be adjusted vertically on the end support 4 to accommodate annular workpieces of different sizes. One side of the valve is forward of the other to provide the necessary "lead." When the motors 16 and 21 are running, the grinding stones are rapidly rotated and the workpiece, due to its oblique position, travels along the stones toward the left as viewed in Figs. 1 and 2, and, as a result, all of the inner and outer peripheral edges of the workpiece are concurrently ground. When the workpiece approaches the end of its travel toward the left, in Fig. 4, its lower side engages the stop 32 tilting the switch lever 30 to actuate the "mercoid" switch 31, and, as a result, the resistance 37 is cut out by the solenoid 36 causing the speed of rotation of the upper stone 15 to be substantially increased, and as a result the workpiece travels in the opposite direction toward the right as viewed in Figs. 1 and 2. Due to the rotation of the lower stones in relatively opposite directions, the "lag" necessary to effect grinding is provided. When the workpiece reaches the position shown in Fig. 4, its lower side engages the resiliently positioned stop 34 to again tilt the switch lever 30 to actuate the "mercoid" switch to de-energize the solenoid 36, and, as a result, the resistance 37 is cut in and the upper stone is slowed down. The workpiece may be caused to repeat its cycle or removed from the free ends of the stones by hand or otherwise.

Figures 9, 10, 11, 12:
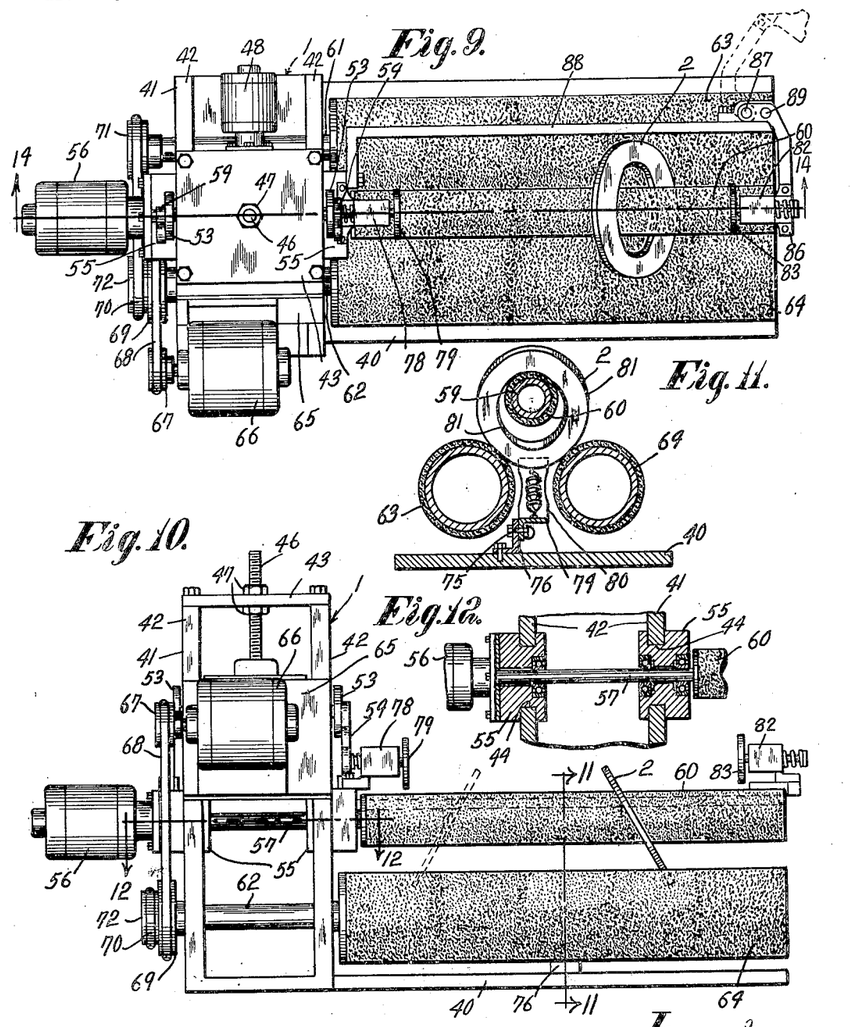
Fig. 9 is a plan view of an abrading machine constructed in accordance with another illustrative form of the invention.
Fig. 10 is a side elevational view of the machine shown in Fig. 9.
Fig. 11 is a cross-sectional view taken substantially on line 11—11 of Fig. 10.
Fig. 12 is a horizontal sectional view taken on line 12—12 of Fig. 10.
Figure 13:
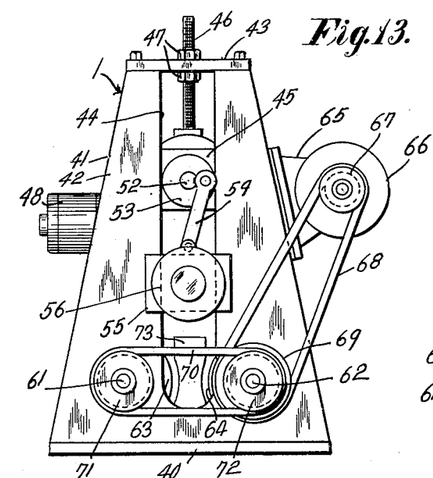
Fig. 13 is an end elevational view of the improved abrading machine shown in Figs. 9 and 10.

In the embodiment shown in Figs. 9 to 19 inclusive, the annular workpiece may be placed over the free end of the upper grinding stone 60 into the position shown in full lines in Fig. 10. With its upper edge inclined forwardly during running of the motors 48, 56 and 66, the workpiece, due to the larger diameter of the lower stone 63, has one side automatically inclined forwardly to provide the necessary "lead," and the annulus travels along the stones toward the left as viewed in Figs. 9 and 10. Since the lower stones revolve in a direction opposite the direction of rotation of the upper stone, the necessary "lag" for grinding is afforded. When the workpiece approaches the end of its travel toward the left in Fig. 14, its lower side engages the stop 73 to tilt the switch lever 74 to actuate the "mercoid" switch 77, and, as a result, the solenoid 78 is energized to cause the plunger 79 to tilt the workpiece into its reverse position as indicated in dotted lines in Fig. 10. The workpiece then travels toward the right along the stones. When the workpiece reaches the end of its travel toward the right, its lower edge engages the resiliently positioned stop 80 to actuate the "mercoid" switch 77 to de-energize the solenoid 78 and to actuate the switch 81 for energizing the solenoid 82 so as to tilt the workpiece to the left and cause it to travel again in that direction. If it is desired to remove the workpiece from the stones, the solenoid 82 may be swung into the position shown in dotted lines in Fig. 9 while the workpiece is traveling to the right. The finished workpiece may then be removed from the grinding stones by hand or otherwise.

In the embodiment shown in Figs. 20 and 21, the workpiece is tilted and forced along the stones by the arms 95 and 96, the movement of the workpiece along the stones being synchronized with the vertical reciprocations of the stone 60 so that the workpiece reaches the end of its travel in each direction at the same time the stone 60 is at its highest point, and reaching a point midway between its ends of travel when the stone 60 is at its lowest point. It will be understood that a plurality of workpieces may be processed simultaneously.

In the several embodiments above described, in lieu of the several driving motors disclosed, the stones may be driven by but a single motor through suitable transmission connections, in a manner that will be well understood by those skilled in the art.

As a result of this invention an improved abrading machine is provided whereby a workpiece of annular shape may have its inner and outer peripheral edges concurrently finished in a novel manner. By the novel arrangement of the grinding stones, the annular workpiece travels automatically back and forth along the stones, and the workpiece is automatically reversed at the end of its travel. Annular workpieces of different sizes may be ground on the improved machine, and, in one embodiment, the annular workpiece may be finished with beveled edges, while in another embodiment, the annular workpiece may be finished with curved edges. Other uses and advantages of the invention will be clearly apparent to those skilled in the art.

While there are in this application specifically described several forms which the invention may assume in practice, it will be understood that these forms of the same are shown for purposes of illustration and that the invention may be further modified and embodied in various other forms without departing from its spirit or the scope of the appended claims.

What I claim as new and desire to secure by Letters Patent is:

1. In a grinding machine, three stones rotatable on axes arranged at the edges of an isosceles prism and so positioned that an annular element to be ground is supported thereon in an inclined position, means for rotating said stones, and means for automatically moving the stone at the apex of the prism to vary its distance from the other stones to effect a rounding of the edges ground.

2. In a grinding machine, three stones rotatable on parallel axes, two engaging the outer edge and one the inner edge of an annulus to be ground, means for rotating said stones, and means for varying the spacing between said two stones and said one stone automatically progressively to effect rounding of the edges ground.

3. In a grinding machine, three stones rotatable on parallel axes, two engaging the outer edge and one the inner edge of an annulus to be ground, means for rotating said stones, and means for moving said one stone relative to said two stones automatically progressively to effect rounding of the edges ground.

4. In a grinding machine, a plurality of grinding stones, two turning towards each other at their tops and the third rotatable at different speeds, the two adapted to engage the outer edges of an annulus to be ground and the third to have the inner edges of such an annulus rest upon it at spaced loci, and means for driving said stones including means controlled by movement of an annulus being ground along them for altering the speed of said third stone.

5. In a grinding machine, a plurality of grinding stones, two turning in the same direction and adapted to support the lower portion of an inclined annulus to be ground and the other turning on an axis nearer the periphery of one of said two stones than to the periphery of the other and adapted to extend through an inclined annulus to be ground, means for rotating said stones, and means for reversing the inclination of such an annulus automatically when it attains to a predetermined position relative to said stones.

6. In an abrading machine, a plurality of abrading stones arranged on parallel axes, two bottom stones and an upper stone, said stones engaging simultaneously the inner and outer peripheries of an annular workpiece, the workpiece being inclined with respect to the stones and due to its manner of engagement with the stones traveling back and forth along the stones as the latter are rotated, means for rotating said stones, and means for moving said upper stone transversely relative to said lower stones so as to change the inclination of the workpiece relative to said stones during its travel along the latter.

7. In an abrading machine, a plurality of abrading stones arranged on parallel axes, two bottom stones and an upper stone, said stones engaging simultaneously the inner and outer peripheries of an annular workpiece, the workpiece being inclined with respect to the stones and due to its manner of engagement with the stones traveling back and forth along the stones as the latter are rotated, means for rotating said stones, means for reciprocating said upper stone transversely relative to said lower stones so as to change the inclination of the workpiece relative to said stones, said upper stone making one complete reciprocation while the workpiece completes its travel in one direction along said stones, and means for tilting the workpiece to different positions on said stones to cause it to reverse its direction of travel.

8. In an abrading machine, a plurality of abrading stones arranged for rotation on parallel axes, two bottom stones and one upper stone, said stones engaging simultaneously the inner and outer peripheries of an annular workpiece, means for rotating said stones, means for reciprocating said upper stone transversely of its axis so as to cause the workpiece to incline at different angles on said stones, and means for moving the workpiece back and forth along said stones, said last mentioned means being synchronized with said reciprocating means for the upper stone so that said upper stone makes one complete reciprocation while the workpiece is moved its full distance in either direction along said stones.

9. In an abrading machine, a plurality of abrading stones arranged for rotation on parallel axes, two bottom stones and one upper stone, said stones engaging simultaneously the inner and outer peripheries of an annular workpiece, means for rotating said stones, means for reciprocating said upper stone transversely of its axis so as to cause the workpiece to incline at different angles on said stones, and means for moving the workpiece back and forth along said stones, said last mentioned means operating to initiate movement of the workpiece in each direction along said stones when said upper stone is in its uppermost position and moving the workpiece its full distance in either direction while said upper stone completes one reciprocation.

10. In an abrading machine, three elongated cylindrical abrading stones, means supporting said stones for rotation on parallel axes disposed at the corners of a triangle, said stones being spaced from each other so as to engage the inner and outer peripheries of an annular workpiece and to support the latter in an inclined position with respect to the stones, and means for rotating said stones including means for varying the speed of rotation of one of said stones.

11. In an abrading machine, three elongated cylindrical abrading stones, means supporting said stones for rotation on parallel axes disposed at the corners of a triangle, said stones being spaced from each other so as to engage the inner and outer peripheries of an annular workpiece and to support the latter in an inclined position with respect to the stones, two of said stones engageable with the outer periphery of the workpiece and being of slightly different diameters and arranged with the stone of larger diameter nearer than is the other of said two stones to the periphery of said third stone so that the workpiece is caused to tilt sideways and provide a "lead," and means for rotating said stones.

12. In an abrading machine, three elongated cylindrical abrading stones, means supporting said stones for rotation on parallel axes disposed at the corners of a triangle, said stones being spaced from each other so as to engage the inner and outer peripheries of an annular workpiece and to support the latter in an inclined position with respect to the stones, two of said stones engageable with the outer periphery of the workpiece and another of said stones engageable with the inner periphery of the workpiece, means for rotating the two stones engageable with the outer periphery in relatively opposite directions, and means for rotating the other of said stones at variable speeds.

13. In an abrading machine, a plurality of elongated cylindrical abrading stones, means supporting said stones for rotation on parallel axes disposed at the corners of a triangle, said stones being spaced from each other so as to engage the inner and outer peripheries of an annular workpiece and to support the latter in an inclined position with respect to the stones, means for rotating two of said stones in relatively opposite directions, means for rotating the other of said stones at a speed to cause the workpiece to travel along the stones in one direction, and means for changing the speed of rotation of said other stone to cause the workpiece to travel in the opposite direction along said stones, said last mentioned means including a member engageable by the workpiece as it approaches the ends of the stones.

14. In an abrading machine, a plurality of elongated cylindrical abrading stones, means supporting said stones for rotation on parallel axes and in such positions that they are engageable by the inner and outer peripheries of an annular workpiece and support the latter in an inclined position relative to the stones, means for rotating said stones, and means for effecting movement of the workpiece in opposite directions along said stones.

15. In an abrading machine, a plurality of elongated cylindrical abrading stones, means supporting said stones for rotation on parallel axes disposed at the corners of a triangle, said stones being engageable by the inner and outer peripheries of an annular workpiece for supporting the latter in an inclined position relative to the stones in such a manner that the workpiece travels along said stones in the direction in which it is inclined on rotation of said stones, means for rotating said stones, and means for reversing the inclination of the workpiece as it approaches the ends of the stones.

16. In an abrading machine, a plurality of elongated cylindrical abrading stones, means supporting said stones for rotation on parallel axes disposed at the corners of a triangle, said stones arranged to support an annular workpiece in an inclined position with two of said stones engaging the outer periphery of the annular workpiece and another engaging the inner periphery of the workpiece, the two stones engaging the outer periphery being of slightly different diameters and arranged with the stone of larger diameter nearer than is the other of said two stones to the periphery of said stone which engages the inner periphery of the workpiece so that the workpiece is caused to tilt sideways and provide a "lead," the workpiece traveling along said stones in the direction in which it is inclined on rotation of said stones, means for rotating said stones, and means for reversing the inclination of the workpiece as it approaches the ends of the stones.

17. In an abrading machine, three elongated cylindrical abrading stones, means supporting said stones for rotation on parallel axes disposed at the corners of a triangle, said stones being spaced from each other so as to one to engage the inner and two to engage the outer periphery of an annular workpiece, and to have the peripheral surfaces of the stones contacting the outer peripheries of said workpiece unequally spaced from the surface of the other stone, and means for rotating said stones.

18. In an abrading machine for simultaneously grinding the inner and outer peripheries of an annular workpiece, three elongated cylindrical abrading stones, means supporting said stones for rotation on parallel axes disposed at the corners of a triangle, one of said stones being of smaller diameter than the internal diameter of the workpiece to be ground, whereby it can extend through the latter, and said other stones being spaced from each other and from said one stone so as to engage the outer periphery of the workpiece while said one stone engages the inner periphery of the latter and to support, with said one stone, the workpiece in an inclined position with respect to the stones, and means for simultaneously rotating said stones one at a materially different peripheral speed from another to effect grinding of the inner and outer peripheries of an annular workpiece.

19. In an abrading machine for simultaneously grinding the inner and outer peripheries of an annular workpiece, three elongated cylindrical abrading stones, means supporting said stones for rotation on parallel axes disposed at the corners of a triangle, one of said stones being of smaller diameter than the internal diameter of the workpiece to be ground, whereby it can extend through the latter, and said other stones being spaced from each other and from said one stone so as to engage the outer periphery of the workpiece while said one stone engages the inner periphery of the latter and to support, with said one stone, the workpiece in an inclined position with respect to the stones, and means for simultaneously rotating said stones one at a materially different speed from the other two to effect grinding of the inner and outer peripheries of an annular workpiece.

20. In an abrading machine for simultaneously grinding the inner and outer peripheries of an annular workpice, three elongated cylindrical abrading stones, means supporting said stones for rotation on parallel axes disposed at the corners of a triangle, one of said stones being of smaller diameter than the internal diameter of the workpiece to be ground, whereby it can extend through the latter, and said other stones being spaced from each other and from said one stone so as to engage the outer periphery of the workpiece while said one stone engages the inner periphery of the latter and to support, with said one stone, the workpiece in an inclined position with respect to the stones, and means for simultaneously rotating said stones one in a different direction from the other two to effect grinding of the inner and outer peripheries of an annular workpiece.

ALEXANDER D. FERGUSON.

REFERENCES CITED

The following references are of record in the file of this patent:

UNITED STATES PATENTS

| Number | Name | Date |
|---|---|---|
| 1,842,375 | Einstein | Jan. 26, 1932 |
| 1,878,116 | Deutsch | Sept. 20, 1932 |
| 2,198,377 | Dunbar et al. | Apr. 23, 1940 |
| 2,344,371 | Shaw | Mar. 14, 1944 |